United States Patent
Tsai

(10) Patent No.: US 7,548,597 B2
(45) Date of Patent: Jun. 16, 2009

(54) CASCADABLE DIVERSITY RECEIVING SYSTEM AND METHOD THEREOF

(75) Inventor: Jia-Cheng Tsai, Kaohsiung (TW)

(73) Assignee: Mediatek Inc., Hsin-Chu (TW)

( * ) Notice: Subject to any disclaimer, the term of this patent is extended or adjusted under 35 U.S.C. 154(b) by 600 days.

(21) Appl. No.: 11/168,767

(22) Filed: Jun. 28, 2005

(65) Prior Publication Data

US 2006/0291600 A1    Dec. 28, 2006

(51) Int. Cl.
    *H04B 7/10* (2006.01)
(52) U.S. Cl. .......................... 375/347; 375/261; 375/259; 375/316; 375/346; 455/60
(58) Field of Classification Search ............... 375/261, 375/259, 316, 347, 346; 455/60
    See application file for complete search history.

(56) References Cited

U.S. PATENT DOCUMENTS

| | | | |
|---|---|---|---|
| 5,559,757 A * | 9/1996 | Catipovic et al. | 367/134 |
| 5,701,333 A * | 12/1997 | Okanoue et al. | 375/347 |
| 5,809,089 A * | 9/1998 | Vasic | 375/341 |
| 5,844,907 A * | 12/1998 | Uchiki et al. | 370/517 |
| 2002/0037057 A1* | 3/2002 | Kroeger et al. | 375/329 |
| 2002/0150185 A1 | 10/2002 | Meehan et al. | 375/347 |
| 2003/0123582 A1* | 7/2003 | Kim et al. | 375/347 |
| 2003/0125040 A1* | 7/2003 | Walton et al. | 455/454 |
| 2006/0013346 A1* | 1/2006 | Maalej et al. | 375/347 |

FOREIGN PATENT DOCUMENTS

| | | |
|---|---|---|
| EP | 1474877 | 11/2004 |
| WO | 03069802 | 8/2003 |
| WO | WO03069802 | 8/2003 |

OTHER PUBLICATIONS

Front page of WO 03 069802 (English), published Aug. 21, 2003.

* cited by examiner

*Primary Examiner*—Shuwang Liu
*Assistant Examiner*—Michael R Neff
(74) *Attorney, Agent, or Firm*—Thomas, Kayden, Horstemeyer & Risley

(57) ABSTRACT

The invention relates to a receiving system and method, and in particular, to a diversity receiving system and method. A diversity receiving system comprises a plurality of cascading receivers for combining a plurality of weighted bit metric streams corresponding to a plurality of radio frequency signals to output a final combined bit metric stream from a final receiver. Each receiver comprises an antenna for receiving a RF signal from a transmitter; a tuner coupled to the antenna for selecting a predetermined channel from the RF signal to generate an input analog signal; and a demapping and combining module coupled to the tuner and a previous demapping and combining module of a previous receiver for performing demapping and combination to generate a combined bit metric stream according to the input analog signal of the tuner and a previous combined bit metric stream of the previous receiver.

16 Claims, 3 Drawing Sheets

CASCADABLE DIVERSITY RECEIVING SYSTEM AND METHOD THEREOF

BACKGROUND

The invention relates to a receiving system and method, and in particular, to a diversity receiving system and method.

In recently years, there is a need to increase data rate in wireless communication devices, especially in multimedia-related applications. In these devices, the transmission performance is important. Digital Video Broadcasting Terrestrial (DVB-T) is a good example. The fastest transmission rate that DVB-T can support is about 30 Mbit/s. However, the transmission performance of DVB-T under some channels, the transmission rate can not be guaranteed, especially in a mobile field. One effective way to solve this problem is the usage of receiver diversity. Some solutions are provided in US Patent application No. 2,002,150,185 and WO03069802. These solutions, however, lack flexibility in hardware architecture, and require significant change in hardware when updating.

SUMMARY

The invention provides a diversity receiving system capable of combining a plurality of weighted bit metric streams. The system comprises a plurality of cascading receivers for combining a plurality of weighted bit metric streams corresponding to a plurality of radio frequency (RF) signals to output a final combined bit metric stream from a final receiver. Each receiver comprises: a tuner for receiving a RF signal and selecting a predetermined channel from the RF signal to generate an input analog signal; and a demapping and combining module coupled to the tuner and a previous demapping and combining module of a previous receiver for performing demapping and combination to generate a combined bit metric stream according to the input analog signal of the tuner and a previous combined bit metric stream of the previous receiver.

The invention further provides a method capable of performing combination steps for combining a plurality of weighted bit metric streams to output a final combined bit metric stream. Each combination step comprises: receiving a RF signal; selecting a predetermined channel from the RF signal to generate an input analog signal; and performing demapping and combination to generate a combined bit metric stream according to the input analog signal and a previous combined bit metric stream of a previous combination step.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE INVENTION

Figure 1:
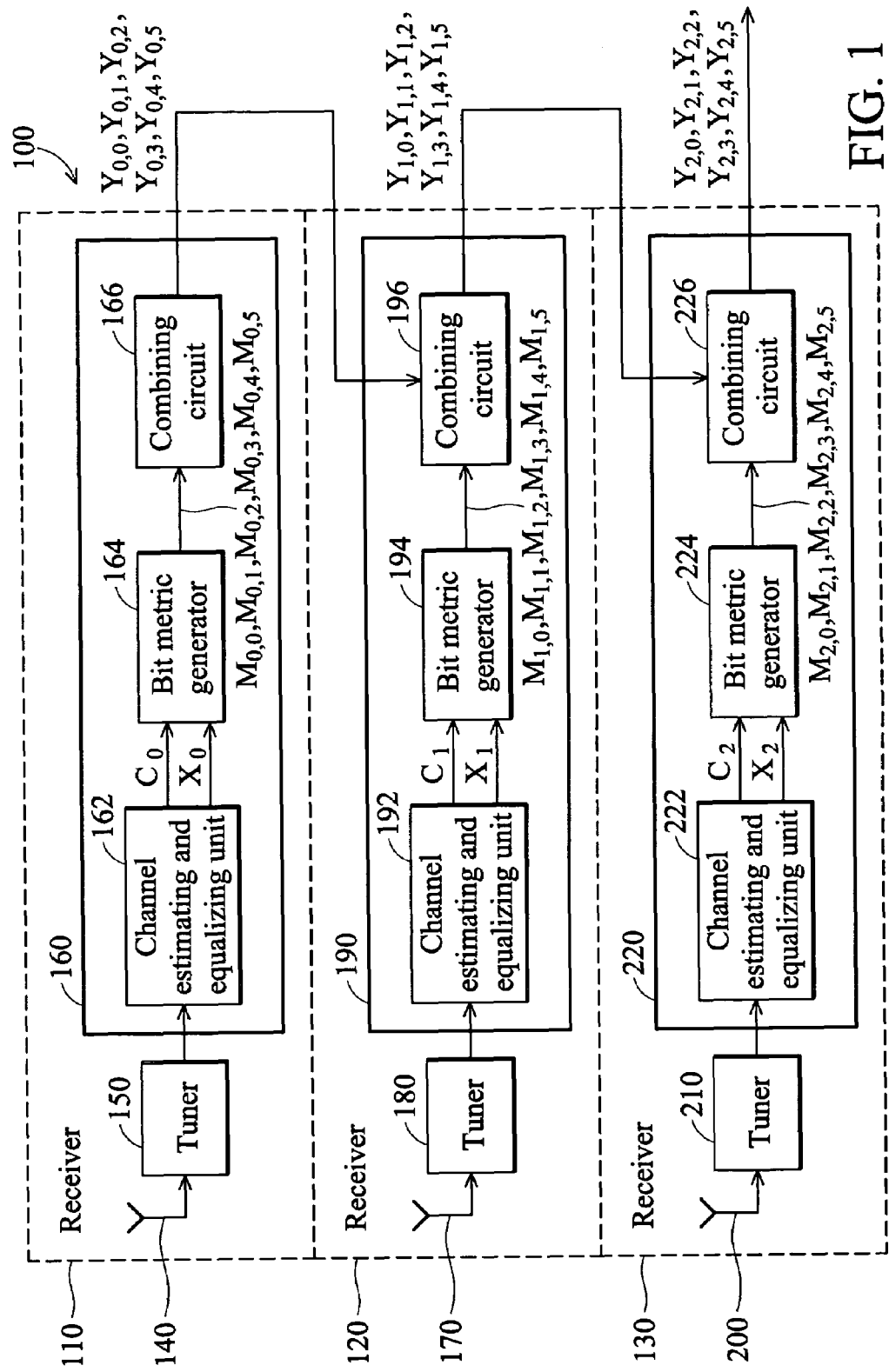
FIG. 1 is a block diagram of a diversity receiving system according to the present invention.

A detailed description of the present invention is provided in the following. Please refer to FIG. 1. FIG. 1 is a block diagram of a diversity receiving system 100 according to an embodiment of the present invention. The diversity receiving system 100 comprises a plurality of cascading receivers 110, 120, and 130 for combining a plurality of weighted bit metric streams, which are respectively demapped from a plurality of radio frequency (RF) signals, to output a final combined bit metric stream from the receiver 130. Each receiver combines its weighted bit metric stream and a previous combined bit metric stream from a previous receiver. Please note that the configuration of three receivers is only meant to serve as an example, and is not meant to be taken as a limitation. In other words, the diversity receiving system of the present invention has the advantage of design flexibility. The number of receivers can be modified to meet requirements of cost and performance. Moreover, the diversity receiving system of the present invention only requires the addition of receivers rather than a hardware change when updating. The operation of each receiver is further detailed in the following.

The receiver 110 comprises an antenna 140, a tuner 150, and a demapping and combining module 160. The receiver 120 comprises an antenna 170, a tuner 180, and a demapping and combining module 190. The receiver 130 comprises an antenna 200, a tuner 210, and a demapping and combining module 220. Because the enumeration of the elements in each receiver is the same, the operation and functionality is only described once for the sake of brevity. The antenna receives a radio frequency signal (RF signal) from a transmitter (not shown). The tuner selects a predetermined channel from the RF signal to generate an input analog signal. Since the functionally of the antenna and the tuner is known to those skilled in the art, further discussion is also omitted for the sake of brevity. The demapping and combining module calculates a weighted bit metric stream, which represents weighted information of the transmitted bit stream, according to the input analog signal, and then combines the weighted bit metric stream of this stage's receiver with that of the previous receiver. The combination method will be described in greater depth later. The operation and functionality of the demapping and combining module of each stage is first detailed in the following.

The demapping and combining module 160 of the first stage receiver (receiver 110) comprises a channel estimating and equalizing unit 162, a bit metric generator 164, and a combining circuit 166. The demapping and combining module 190 of the second stage receiver (receiver 120) comprises a channel estimating and equalizing unit 192, a bit metric generator 194, and a combining circuit 196. The demapping and combining module 220 of the third stage receiver (receiver 130) comprises a channel estimating and equalizing unit 222, a bit metric generator 224, and a combining circuit 226. The channel estimating and equalizing unit 162 performs channel estimation and equalization operation to generate an equalized signal $X_0$ and a signal-noise ratio (SNR) value $C_0$ according to the input analog signal from tuner 150. Similarly, the channel estimating and equalizing unit 192 and the channel estimating and equalizing unit 222 perform the same operation to generate an equalized signal $X_1$ and a SNR value $C_1$, and an equalized signal $X_2$ and a SNR value $C_2$, respectively. The SNR value represents quality of the RF signal from the corresponding receiver. The SNR value is instead called as CSI (Channel State Information) or confidence value in Digital Video Broadcasting-Terrestrial (DVB-T) nomenclature. Since the process of channel estimation and equalization is known to those skilled in the art, further discussion is omitted.

Figure 2:
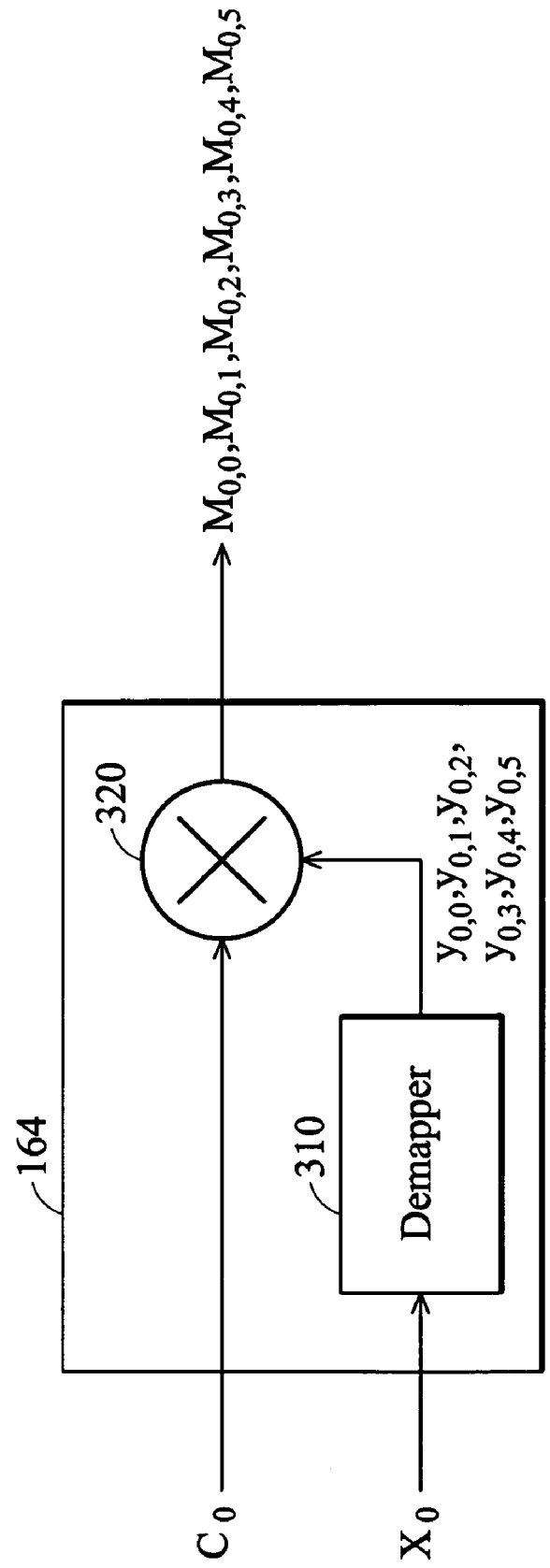
FIG. 2 is a circuit diagram of the bit metric generator used in the receiver of FIG. 1 according to the present invention.

Please refer to FIG. 1 and FIG. 2 at the same time. FIG. 2 is a circuit diagram of the bit metric generator 164 used in the receiver 110 of FIG. 1 according to the present invention. The bit metric generator 164 comprises a demapper 310 and a multiplier 320. Taking digital video broadcasting—Terrestrial (DVB-T) system utilizing 64 quadrature amplitude modulation (64-QAM) as an example, the demapper 310 demaps the equalized signal $X_0$ to output a bit metric stream $y_{0,0},y_{0,1},y_{0,2},y_{0,3},y_{0,4},y_{0,5}$. If the position of the equalized signal $X_0$ in the constellation diagram is $p_0+j*q_0$, each bit metric of the bit metric stream is determined as follows.

$$y_{0,0}=p_0$$

$$y_{0,1}=q_0$$

$$y_{0,2}=|y_{0,0}|-K1$$

$$y_{0,3}=|y_{0,1}|-K1$$

$$Y_{0,4}=|Y_{0,2}|-K2$$

$$y_{0,5}=|y_{0,3}|-K2$$

Wherein K1 and K2 are predetermined values determined by the distances between signals in constellation diagram. Then the multiplier 320 multiples the bit metric stream by the confidence value $C_0$ to generate a weighted bit metric stream $M_{0,0},M_{0,1},M_{0,2},M_{0,3},M_{0,4},M_{0,5}$. Each weighted bit metric of the weighted bit metric stream is shown as follows.

$$M_{0,0}=C_0*y_{0,0}$$

$$M_{0,1}=C_0*y_{0,1}$$

$$M_{0,2}=C_0*y_{0,2}$$

$$M_{0,3}=C_0*y_{0,3}$$

$$M_{0,4}=C_0*y_{0,4}$$

$$M_{0,5}=C_0*y_{0,5}$$

Similarly, the bit metric generator 194 of receiver 120 and the bit metric generator 224 of receiver 130 perform the same operation to generate a weighted bit metric stream $M_{1,0},M_{1,1},M_{1,2},M_{1,3},M_{1,4},M_{1,5}$ and a weighted bit metric stream $M_{2,0},M_{2,1},M_{2,2},M_{2,3},M_{2,4},M_{2,5}$, respectively.

Figure 3:
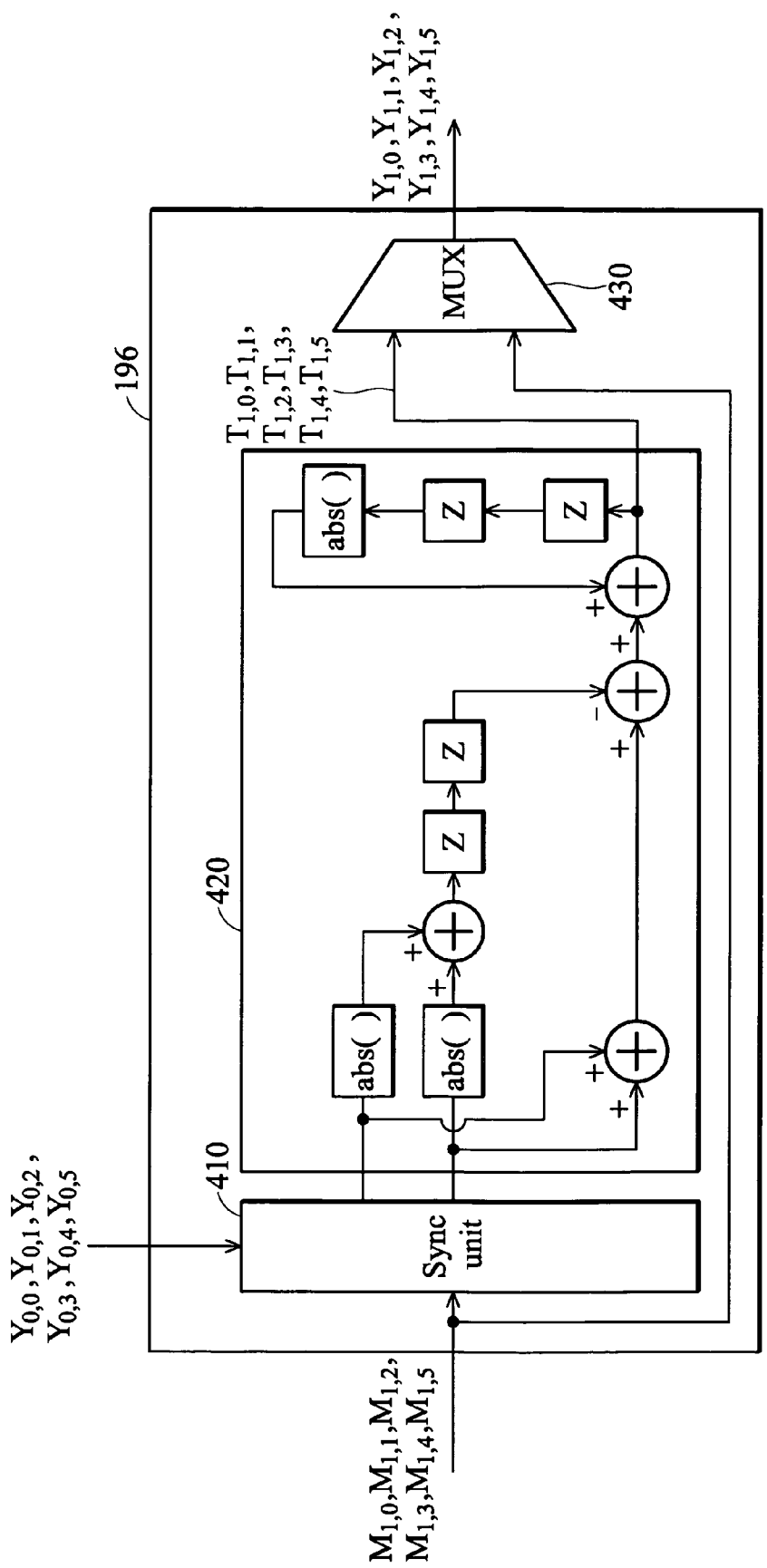
FIG. 3 is a circuit diagram of the combining circuit used in the receiver of FIG. 1 according to the present invention.

Please refer to FIG. 1 and FIG. 3 at the same time. FIG. 3 is a circuit diagram of the combining circuit 196 used in the receiver 120 of FIG. 1 according to the present invention. The combining circuit 196 comprises a sync unit 410, a combining unit 420, and a multiplexer (MUX) 430. The sync unit 410 synchronizes the weighted bit metric stream $M_{1,0},M_{1,1},M_{1,2},M_{1,3},M_{1,4},M_{1,5}$, from bit metric generator 194, with a combined bit metric stream $Y_{0,0},Y_{0,1},Y_{0,2},Y_{0,3},Y_{0,4},Y_{0,5}$, from combining circuit 166 to generate two synchronized bit metric streams. The combined bit metric stream $Y_{0,0},Y_{0,1},Y_{0,2},Y_{0,3},Y_{0,4},Y_{0,5}$ output from the combining circuit 166 is equal to the weighted bit metric stream $M_{0,0},M_{0,1},M_{0,2},M_{0,3},M_{0,4},M_{0,5}$, selected by its own MUX (not shown), since the receiver 110 is the first stage receiver and does not need to perform a combination process. The combining unit 420 performs an equivalent maximal ratio combination (MRC) process to combine these two synchronized streams (weighted bit metric stream $M_{1,0},M_{1,1},M_{1,2},M_{1,3},M_{1,4},M_{1,5}$ and combined bit metric stream $Y_{0,0},Y_{0,1},Y_{0,2},Y_{0,3},Y_{0,4},Y_{0,5}$) to generate a temporary bit metric stream $T_{1,0},T_{1,1},T_{1,2},T_{1,3},T_{1,4},T_{1,5}$. Please note that the above-mentioned equivalent MRC process is only meant to serve as an example, and it not meant to be taken as a limitation. When the demapper is a 64 quadrature amplitude modulation (64-QAM) demapper, each tem porary bit metric of the temporary bit metric stream is shown in the following.

$$T_{1,0}=Y_{0,0}+M_{1,0}$$

$$T_{1,1}=Y_{0,1}+M_{1,1}$$

$$T_{1,2}=Y_{0,2}+M_{1,2}+|T_{1,0}|-|Y_{0,0}|-|M_{1,0}|$$

$$T_{1,3}=Y_{0,3}+M_{1,3}+|T_{1,1}|-|Y_{0,1}|-|M_{1,1}|$$

$$T_{1,4}=Y_{0,4}+M_{1,4}+|T_{1,2}|Y_{0,2}|-|M_{1,2}|$$

$$T_{1,5}=Y_{0,5}+M_{1,5}+|T_{1,3}|-|Y_{0,3}|-|M_{1,3}|$$

The above-mentioned equivalent MRC process, wherein its input stream has already been demapped from the equalized signal, is equivalent to performing a related art MRC process with the equalized signal and then performing a demapping process. The general formula about the equivalent MRC process is shown in the following.

$$T_{i+1,0}=Y_{i,0}+M_{i+1,0}$$

$$T_{i+1,1}=Y_{i,1}+M_{i+1,1}$$

$$T_{i+1,2}=Y_{i,2}+M_{i+1,2}+|T_{i+1,0}|-|Y_{i,0}|-|M_{i+1,0}|$$

$$T_{i+1,3}=Y_{i,3}+M_{i+1,3}+|T_{i+1,1}|-|Y_{i,1}|-|M_{i+1,1}|$$

$$T_{i+1,4}=Y_{i,4}+M_{i+1,4}+|T_{i+1,2}|-|Y_{i,2}|-|M_{i+1,2}|$$

$$T_{i+1,5}=Y_{i,5}+M_{i+1,5}+|T_{i+1,3}|-|Y_{i,3}|-|M_{i+1,3}|$$

Wherein the temporary bit metric stream $T_{i+1,0},T_{i+1,1},T_{i+1,2},T_{i+1,3},T_{i+1,4},T_{i+1,5}$ is the current stage combining unit's output, the combined bit metric stream $Y_{i,0},Y_{i,1},Y_{i,2},Y_{i,3},Y_{i,4},Y_{i,5}$ is the previous stage receiver's output, and the weighted bit metric stream $M_{i+1,0},M_{i+1,1},M_{i+1,2},M_{i+1,3},M_{i+1,4},M_{i+1,5}$ is the current stage bit metric generator's output.

In applications other than the 64-QAM demapper mentioned above, the system operates similarly. When the demapper is a 16 quadrature amplitude modulation (16-QAM) demapper, the temporary bit metric stream is output from the combining unit according to the following operation:

$$T_{i+1,0}=Y_{i,0}+M_{i+1,0}$$

$$T_{i+1,1}=Y_{i,1}+M_{i+1,1}$$

$$T_{i+1,2}=Y_{i,2}+M_{i+1,2}+|T_{i+1,0}|-|Y_{i,0}|-|M_{i+1,0}|$$

$$T_{i+1,3}=Y_{i,3}+M_{i+1,3}+|T_{i+1,1}|-|Y_{i,1}|-|M_{i+1,1}|$$

When the demapper is a quadrature phase shift keying (QPSK) demapper, the temporary bit metric stream is output from the combining unit according to the following operation:

$$T_{i+1,0}=Y_{i,0}+M_{i+1,0}$$

$$T_{i+1,1}=Y_{i,1}+M_{i+1,1}$$

The MUX 430 then selects either the temporary bit metric stream $T_{1,0},T_{1,1},T_{1,2},T_{1,3},T_{1,4},T_{1,5}$ or the weighted bit metric stream $M_{1,0},M_{1,1},M_{1,2},M_{1,3},M_{1,4},M_{1,5}$ to be the new combined bit metric stream $Y_{1,0},Y_{1,1},Y_{1,2},Y_{1,3},Y_{1,4},Y_{1,5}$. Since the MRC combination is effective in the second stage receiver 120, the MUX 430 will select the temporary bit metric stream $T_{1,0},T_{1,1},T_{1,2},T_{1,3},T_{1,4},T_{1,5}$ to be the new combined bit metric stream $Y_{1,0},Y_{1,1},Y_{1,2},Y_{1,3},Y_{1,4},Y_{1,5}$ of receiver 120. Similarly, the combining circuit 226 of the receiver 130 performs equivalent MRC process to generate a temporary bit metric stream $T_{2,0},T_{2,1},T_{2,2},T_{2,3},T_{2,4},T_{2,5}$, and then utilizes its own MUX (not shown) to select the temporary bit metric stream $T_{2,0},T_{2,1},T_{2,2},T_{2,3},T_{2,4},T_{2,5}$ to be its output combined bit metric stream $Y_{2,0},Y_{2,1},Y_{2,2},Y_{2,3},Y_{2,4},Y_{2,5}$. Finally, the combined bit metric stream $Y_{2,0},Y_{2,1},Y_{2,2},Y_{2,3},Y_{2,4},Y_{2,5}$ is sent to a next stage decoder (not shown). In DVB-T system, the decoder is a Viterbi decoder.

While the invention has been described by way of example and in terms of the preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A diversity receiving system comprising a plurality of cascading receivers for combining a plurality of weighted bit metric streams corresponding to a plurality of radio frequency (RF) signals to output a final combined bit metric stream from a final receiver in said plurality of cascading receivers, each receiver comprising:
a tuner for receiving an RF signal and selecting a predetermined channel from the RF signal to generate an input analog signal; and
a demapping and combining module coupled to the tuner and a previous demapping and combining module of a previous receiver for performing demapping according to the input analog signal of the tuner to generate a weighted bit metric stream and then performing combination to generate a combined bit metric stream according to the weighted bit metric stream and a previous combined bit metric stream of the previous receiver, wherein the demapping and combining module comprises:
a channel estimating and equalizing unit for performing channel estimation and equalization to generate an equalized signal and a confidence value according to the RF signal;
a bit metric generator coupled to the channel estimating and equalizing unit for demapping the equalized signal into bit metric stream and then performing weighting multiplication to the bit metric stream according to the confidence value to generate the weighted bit metric stream; and
a combining circuit coupled to the bit metric generator and a previous combining circuit for performing combination to generate the combined bit metric stream according to the weighted bit metric stream and the previous combined bit metric stream from the previous combining circuit, wherein the combining circuit comprises:
a sync unit for synchronizing the weighted bit metric stream with the previous combined bit metric stream;
a combining unit coupled to the sync unit for performing equivalent maximal ratio combination (MRC) to combine the weighted bit metric stream and the previous combined bit metric stream to generate a temporary bit metric stream; and
a multiplexer (MUX) coupled to the combining circuit, the bit metric generator and the previous combining circuit for selecting either the temporary bit metric stream or the weighted bit metric stream to be the combined bit metric stream.

2. The diversity receiving system according to claim 1 wherein the bit metric generator comprises:
a demapper for demapping the equalized signal to generate a bit metric stream; and
a multiplier coupled to the demapper for multiplying the bit metric stream with the confidence value to generate the weighted bit metric stream.

3. The diversity receiving system according to claim 1, wherein the demapper is a 64 quadrature amplitude modulation (64-QAM) demapper, and the temporary bit metric stream is output from the combining unit according to the following operation:

$$T_{i+1,0}=Y_{i,0}+M_{i+1,0}$$

$$T_{i+1,1}=Y_{i,1}+M_{i+1,1}$$

$$T_{i+1,2}=Y_{i,2}+M_{i+1,2}+|T_{i+1,0}|-|Y_{i,0}|-|M_{i+1,0}|$$

$$T_{i+1,3}=Y_{i,3}+M_{i+1,3}+|T_{i+1,1}|-|Y_{i,1}|-|M_{i+1,1}|$$

$$T_{i+1,4}=Y_{i,4}+M_{i+1,4}+|T_{i+1,2}|-|Y_{i,2}|-|M_{i+1,2}|$$

$$T_{i+1,5}=Y_{i,5}+M_{i+1,5}+|T_{i+1,3}|-|Y_{i,3}|-|M_{i+1,3}|$$

Wherein $T_{i+1,0},T_{i+1,1},T_{i+1,2},T_{i+1,3},T_{i+1,4},T_{i+1,5}$ is the temporary bit metric stream, $Y_{i,0},Y_{i,1},Y_{i,2},Y_{i,3},Y_{i,4},Y_{i,5}$ is the previous combined bit metric stream, and $M_{i+1,0},M_{i+1,1},M_{i+1,2},M_{i+1,3},M_{i+1,4},M_{i+1,5}$ is the weighted bit metric stream.

4. The diversity receiving system according to claim 1, wherein the demapper is a 16 quadrature amplitude modulation (16-QAM) demapper, and the temporary bit metric stream is output from the combining unit according to the following operation:

$$T_{i+1,0}=Y_{i,0}+M_{i+1,0}$$

$$T_{i+1,1}=Y_{i,1}+M_{i+1,1}$$

$$T_{i+1,2}=Y_{i,2}+M_{i+1,2}+|T_{i+1,0}|-|Y_{i,0}|-|M_{i+1,0}|$$

$$T_{i+1,3}=Y_{i,3}+M_{i+1,3}+|T_{i+1,1}|-|Y_{i,1}|-|M_{i+1,1}|$$

Wherein $T_{i+1,0},T_{i+1,1},T_{i+1,2},T_{i+1,3}$ is the temporary bit metric stream, $Y_{i,0},Y_{i,1},Y_{i,2},Y_{i,3}$ is the previous combined bit metric stream, and $M_{i+1,0},M_{i+1,1},M_{i+1,2}M_{i+1,3}$ is the weighted bit metric stream.

5. The diversity receiving system according to claim 1, wherein the demapper is a quadrature phase shift keying (QPSK) demapper, and the temporary bit metric stream is output from the combining unit according to the following operation:

$$T_{i+1,0}=Y_{i,0}+M_{i+1,0}$$

$$T_{i+1,1}=Y_{i,1}+M_{i+1,1}$$

Wherein $T_{i+1,0},T_{i+1,1}$ is the temporary bit metric stream, $Y_{i,0}$, $Y_{i,1}$ is the previous combined bit metric stream, and $M_{i+1,0}$, $M_{i+1,1}$ is the weighted bit metric stream.

6. A method capable of performing combination steps for combining a plurality of weighted bit metric streams to output a final combined bit metric stream, each combination step comprising:
receiving a RF signal;
selecting a predetermined channel from the RF signal to generate an input analog signal;
performing demapping according to the input analog signal to generate a weighted bit metric stream; and
performing combination to generate a combined bit metric stream according to the weighted bit metric stream and a previous combined bit metric stream of a previous combination step, wherein performing combination further comprises:

synchronizing the weighted bit metric stream with the previous combined bit metric stream;

performing equivalent maximal ratio combination (MRC) to combine the weighted bit metric stream and the previous combined bit metric stream to generate a temporary bit metric stream; and selecting either the temporary bit metric stream or the weighted bit metric stream to be the combined bit metric stream.

7. The method according to claim 6, wherein performing demapping comprises:

performing channel estimation and equalization to generate an equalized signal and a confidence value according to the RF signal;

performing demapping to the equalized signal and generating the weighted bit stream according to the confidence value.

8. The method according to claim 7, wherein performing demapping further comprises:

demapping the equalized signal to generate a bit metric stream; and multiplying the bit metric stream with the confidence value to generate the weighted bit metric stream.

9. The method according to claim 6, wherein the temporary bit metric stream is shown as follows:

$$T_{i+1,0}=Y_{i,0}+M_{i+1,0}$$

$$T_{i+1,1}=Y_{i,1}+M_{i+1,1}$$

$$T_{i+1,2}=Y_{i,2}+M_{i+1,2}+|T_{i+1,0}|-|Y_{i,0}|-|M_{i+1,0}|$$

$$T_{i+1,3}=Y_{i,3}+M_{i+1,3}+|T_{i+1,1}|-|Y_{i,1}|-|M_{i+1,1}|$$

$$T_{i+1,4}=Y_{i,4}+M_{i+1,4}+|T_{i+1,2}|-|Y_{i,2}|-|M_{i+1,2}|$$

$$T_{i+1,5}=Y_{i,5}+M_{i+1,5}+|T_{i+1,3}|-|Y_{i,3}|-|M_{i+1,3}|$$

Wherein $T_{i+1,0},T_{i+1,1},T_{i+1,2},T_{i+1,3},T_{i+1,4},T_{i+1,5}$ is the temporary bit metric stream, $Y_{i,0},Y_{i,1},Y_{i,2},Y_{i,3},Y_{i,4},Y_{i,5}$ is the previous combined bit metric stream, and $M_{i+1,0},M_{i+1,1},M_{i+1,2},M_{i+1,3},M_{i+1,4}\ M_{i+1,5}$ is the weighted bit metric stream.

10. The method according to claim 6, wherein the temporal bit stream is as follows:

$$T_{i+1,0}=Y_{i,0}+M_{i+1,0}$$

$$T_{i+1,1}=Y_{i,1}+M_{i+1,1}$$

$$T_{i+1,2}=Y_{i,2}+M_{i+1,2}+|T_{i+1,0}|Y_{i,0}|-|M_{i+1,0}|$$

$$T_{i+1,3}=Y_{i,3}+M_{i+1,3}+|T_{i+1,1}|-|Y_{i,1}|-|M_{i+1,1}|$$

Wherein $T_{i+1,0},T_{i+1,1},T_{i+1,2},T_{i+1,3}$ is the temporary bit metric stream, $Y_{i,0},Y_{i,1},Y_{i,2},Y_{i,3}$ is the previous combined bit metric stream, and $M_{i+1,0},M_{i+1,1},M_{i+1,2},M_{i+1,3}$ is the weighted bit metric stream.

11. The method according to claim 6, wherein the temporal bit stream is as follows:

$$T_{i+1,0}=Y_{i,0}+M_{i+1,0}$$

$$T_{i+1,1}=Y_{i,1}+M_{i+1,1}$$

Wherein $T_{i+1,0},T_{i+1,1}$ is the temporary bit metric stream, $Y_{i,0},Y_{i,1}$ is the previous combined bit metric stream, and $M_{i+1,0},M_{i+1,1},M_{i+1,2},M_{i+1,3}$ is the weighted bit metric stream.

12. A diversity receiving system comprising a plurality of cascading receivers for combining a plurality of weighted bit metric streams corresponding to a plurality of radio frequency (RF) signals to output a final combined bit metric stream from a final receiver in said plurality of cascading receivers, each receiver comprising:

a tuner for receiving an RF signal and selecting a predetermined channel from the RF signal to generate an input analog signal; and a demapping and combining module coupled to the tuner and a previous demapping and combining module of a previous receiver for performing demapping according to the input analog signal of the tuner to generate a weighted bit metric stream and then performing combination to generate a combined bit metric stream according to the weighted bit metric stream and a previous combined bit metric stream of the previous receiver, wherein the demapping and combining module comprises:

a channel estimating and equalizing unit for performing channel estimation and equalization to generate an equalized signal and a confidence value according to the RF signal;

a bit metric generator coupled to the channel estimating and equalizing unit for demapping the equalized signal into bit metric stream and then performing weighting multiplication to the bit metric stream according to the confidence value to generate the weighted bit metric stream; and a combining circuit coupled to the bit metric generator and a previous combining circuit for performing combination to generate the combined bit metric stream according to the weighted bit metric stream and the previous combined bit metric stream from the previous combining circuit, wherein the combining circuit comprises:

a sync unit for synchronizing the weighted bit metric stream with the previous combined bit metric stream; and a combining unit coupled to the sync unit for performing equivalent maximal ratio combination (MRC) to combine the weighted bit metric stream and the previous combined bit metric stream to generate a temporary bit metric stream as the combined bit metric stream.

13. The diversity receiving system according to claim 12, wherein the bit metric generator comprises:

a demapper for demapping the equalized signal to generate a bit metric stream; and a multiplier coupled to the demapper for multiplying the bit metric stream with the confidence value to generate the weighted bit metric stream.

14. The diversity receiving system according to claim 12, wherein the demapper is a 64 quadrature amplitude modulation (64-QAM) demapper, and the temporary bit metric stream is output from the combining unit according to the following operation:

$$T_{i+1,0}=Y_{i,0}+M_{i+1,0}$$

$$T_{i+1,1}=Y_{i,1}+M_{i+1,1}$$

$$T_{i+1,2}=Y_{i,2}+M_{i+1,2}+|T_{i+1,0}|-|Y_{i,0}|-|M_{i+1,0}|$$

$$T_{i+1,3}=Y_{i,3}+M_{i+1,3}+|T_{i+1,1}|-|Y_{i,1}|-|M_{i+1,2}|$$

$$T_{i+1,4}=Y_{i,4}+M_{i+1,4}+|T_{i+1,2}|-|Y_{i,2}|-|M_{i+1,2}|$$

$$T_{i+1,5}=Y_{i,5}+M_{i+1,5}+|T_{i+1,3}|-|Y_{i,3}|-|M_{i+1,3}|$$

Wherein $T_{i+1,0}, T_{i+1,1}, T_{i+1,2}, T_{i+1,3}, T_{i+1,4}, T_{i+i,5}$ is the temporary bit metric stream, $Y_{i,0}, Y_{i,1}, Y_{i,2}, Y_{i,3}, Y_{i,4}, Y_{i,5}$ is the previous combined bit metric stream, and $M_{i+1,0}, M_{i+1,1}, M_{i+1,2}, M_{i+1,3}, M_{i+1,4}, M_{i+1,5}$ is the weighted bit metric stream.

15. The diversity receiving system according to claim 12, wherein the demapper is a 16 quadrature amplitude modulation (16-QAM) demapper, and the temporary bit metric stream is output from the combining unit according to the following operation:

$$T_{i+1,0} = Y_{i,0} + M_{i+1,0}$$

$$T_{i+1,1} = Y_{i,1} + M_{i+1,1}$$

$$T_{i+1,2} = Y_{i,2} + M_{i+1,2} + |T_{i+1,0}|Y_{i,0}| - |M_{i+1,0}|$$

$$T_{i+1,3} = Y_{i,3} + M_{i+1,3} + |T_{i+1,1}| - |Y_{i,1}| - |M_{i+1,1}|$$

Wherein $T_{i+1,0}, T_{i+1,1}, T_{i+1,2}, T_{i+1,3}$ is the temporary bit metric stream, $Y_{i,0}, Y_{i,1}, Y_{i,2}, Y_{i,3}$ is the previous combined bit metric stream, and $M_{i+1,0}, M_{i+1,1}, M_{i+1,2}, M_{i+1,3}$ is the weighted bit metric stream.

16. The diversity receiving system according to claim 12, wherein the demapper is a quadrature phase shift keying (QPSK) demapper, and the temporary bit metric stream is output from the combining unit according to the following operation:

$$T_{i+1,0} = Y_{i,0} + M_{i+1,0}$$

$$T_{i+1,1} = Y_{i,1} + M_{i+1,1}$$

Wherein $T_{i+1,0}, T_{i+1,1}$, is the temporary bit metric stream, $Y_{i,0}, Y_{i,1}$ is the previous combined bit metric stream, and $M_{i+1,0} M_{i,1,1}$ is the weighted bit metric stream.

* * * * *